April 11, 1967 W. J. McWILLIAMS 3,313,495

HUB EXPANDING DEVICE

Filed Aug. 30, 1965

INVENTOR.
WILLIAM J. McWILLIAMS
BY Mosely & Hallacher
ATTORNEYS

United States Patent Office 3,313,495
Patented Apr. 11, 1967

3,313,495
HUB EXPANDING DEVICE

William J. McWilliams, Cement City, Mich., assignor to Collins Radio Company, Cedar Rapids, Iowa, a corporation of Iowa Filed Aug. 30, 1965, Ser. No. 483,439
5 Claims. (Cl. 242—68.3)

This invention relates to an expandable hub mechanism useful in holding tape or film reels securely to a rotating shaft.

Many instruments, such as computers, tape decks and motion picture projectors utilize a reel of tape or film in their operation. The usual design of such devices comprises a hub which is mounted on a rotating shaft. The reel is provided with a central hole through which the hub is received. A fastening means is then employed to enable the reel to rotate with the hub. As the tape or film reaches an end, or for many other reasons, it frequently becomes necessary to change the reels. Also because in most instruments the speed of rotation is critical, it is necessary to apply a sufficient force to insure that the reel rotates uniformly with the hub. At the same time it is desirable to be able to change the reels in a minimum time period and with a minimum of efforts and motion on the part of the attendant.

Many prior art devices for changing such reels suffer the disadvantage of requiring a fairly long period of time to effect the change because the removal of bolts or screws is frequently necessary. Also these devices have the disadvantage of having an unreliable unknown tension applied to the rim of the reel and therefore said rims are frequently multilated and damaged. Consequently there has long existed in the art the need for a mechanism which permits the rapid change of such reels with the minimum of movement and effort by the attendant while at the same time applying a known and controlled holding force to the reel.

It is therefore an object of this invention to provide an expandable hub;

It is another object of this invention to provide such a device which requires a minimum of movement by the operator;

It is another object to provide such a device which applies a known and uniform holding force to the interior rim of the reel and therefore minimize the change for multilating or marring said reel.

Further objects, features, and advantages of the invention will become apparent from the following description and claims when read in view of the accompanying drawing wherein like number indicate like parts and, in which:

Figure 1:
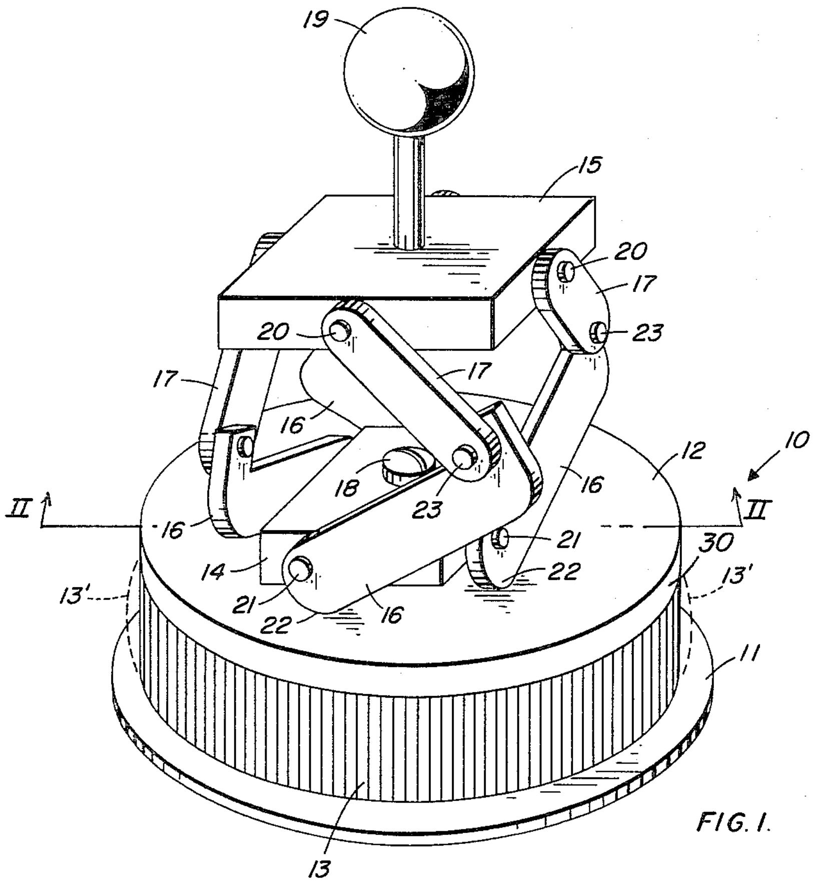
FIGURE 1 shows an isometric view of an expandable hub mechanism 10 which is one embodiment of the inventive concept.

A pair of base plates 11 and 12 are arranged in a parallel relationship with their axis of symmetry being coincident. Positioned between bases 11 and 12 is an elastic member 13 which maintains the bases in their parallel relationship. A plate 14 is attached to base 12 by means of an adjusting screw 18. Lying above plate 14 and parallel therewith is a second plate 15. Plate 15 is attached to plate 14 by means of a lever 17 and an elongated cam 16. Lever 17 is rotatably attached to plate 15 by means of set screws 20 or other rotatable fastening means. Lever 20 is also rotatably attached to cam 16 by means of additional set screws 23. The other end of cam 16 is rotatably attached to plate 14 by means of set screws 21. As shown, set screw 21 is positioned off-center in cam 16, the rounded end of cam 16 therefore forms a camming surface 22 which acts against base 12. Because the plates 14 and 15 are connected through lever 17 and cam 16 by means of rotatable junctions the plate 15 is able to move with respect to plate 14 along an axis perpendicular to the plane of the plates. Such movement will cause rotation of cam 16 about set screw 21. Because cam 16 is formed with camming surface 22 which rests upon base 12 the movement of cam 16 causes plate 14 to move toward base 11. Elastic member 13 is deformed by movement of base 12 such that it assumes the curved configuration shown in dotted lines 13' in the figure. When in this position elastic member 13 will grip the interior rim of a reel which is mounted upon hub 10. Removal of the reel can be effected by pulling plate 15 away from plate 14 by means of knob 19 mounted upon plate 15. This motion causes lever 17 and cam 16 to rotate such that camming surface 22 no longer applies a biasing force to base 12. Removal of this force enables elastic member 13 to retain its normal shape and thereby remove the gripping force from the interior of the reel. In the embodiment shown elastic member 13 returns to its original configuration because of its own elasticity. However, this can be assisted simply by mounting a spring, or other means, between bases 11 and 12. The biasing force applied to base 12 by cam 16 can be changed to any desired value by means of adjusting screw 18. By adjustment of this screw plate 14 can be moved toward, or away from, base 12 which will increase or decrease the biasing force applied by cam 16. It should be noted that four combinations of lever 17 and cam 16 are shown in the figure. This number can be changed by applying a means, such as guide rods, which will insure that the parallel relationship of plates 14 and 15 is maintained. It should also be noted that elastic member 13 can be annular in which instance it can be mounted upon a disk or in curves supplied in bases 11 and 12 or alternatively it can be a solid member which is readily deformable upon the application of pressure by plate 12.

Figure 2:
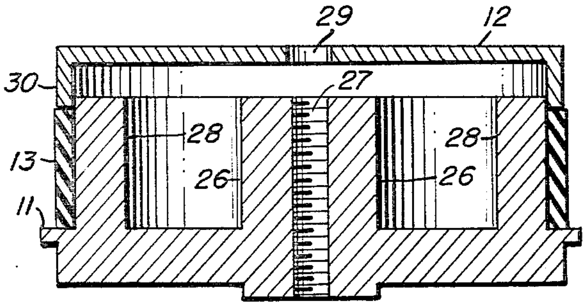
FIGURE 2 shows a sectional view of the base taken along line II—II of FIGURE 1.

One preferred embodiment of the base construction is shown in a sectional view in FIGURE 2. Base 11 is shown to be formed with a hub 26 concentrically located in the base. Base 11 is also formed with an annular portion 28 around which elastic member 13 is placed. Base 12 is formed with a ring portion 30 which rests on the upper portion of elastic member 13 when assembled with base 11. Bases 11 and 12 are formed with aligned holes 27 and 29 respectively. Hole 27 is drilled and threaded to receive screw 18 shown in FIGURE 1. Hole 29 is sufficiently large to allow screw 18 to freely pass through said hole. Plate 14, shown in FIGURE 1, rests directly on base 12 and is retained in this position by threading screw 18 into hole 27. Operation of the mechanism by applying pressure to plate 15 causes cams 16 to act against base 12 to cause deformation of elastic member 13.

Although this invention has been described with respect to a particular embodiment thereof, it is not to be so limited, as changes and modifications may be made therein which are within the spirit and scope of the invention as defined by the appended claims.

I claim:

1. An expandable hub comprising: a first and a second base, said first and second bases being positioned in a substantially parallel relationship with their axis of symmetry lying coincident, elastic means positioned between said bases, said elastic means acting as a biasing means for biasing said bases apart, and actuating means ssociated with said first base so that operation of said actuating means counteracts the force of said biasing means and moves said first base toward said second base to thereby deform said elastic means, said actuating means comprising; a first plate adjustably associated with said first base, a second plate positioned substantially parallel to said first plate, and a plurality of cam and lever means connecting said first and second plates at equal intervals so that a force applied to said second plate causes movement of said cam and lever means to thereby cause movement of said first base toward said second base.

2. The hub of claim 1 wherein said elastic means is annular.

3. The device of claim 1 wherein said plurality of cam and lever means each comprises a lever rotatably connected to said second plate, and an elongated cam rotatably connected to said lever and to said second plate.

4. The device of claim 2 wherein said plurality of cam and lever means each comprises a lever rotatably connected to said second plate, and an elongated cam rotatably connected to said lever and to said second plate.

5. An adjustable hub comprising: a first base and a second base, an annular elastic member positioned between said first and second bases to form a right cylinder, a first block adjustably mounted on one end of said cylinder, a second block positioned substantially parallel to said first block and spaced therefrom, a plurality of levers rotatably connected to said second block at equal intervals thereabout, a plurality of cams rotatably attached to said first block at equal intervals thereabout, one each of said levers being rotatably associated with one each of said cams so that said second block is moveable along an axis perpendicular to the plane of said blocks, such movement causing said plurality of cams to act against one of said bases to thereby deform said elastic member.

References Cited by the Examiner

UNITED STATES PATENTS

| | | | |
|---|---|---|---|
| 2,546,746 | 8/1951 | Bauer | 242—68 X |
| 3,000,582 | 9/1961 | Brede | 242—68 X |

FOREIGN PATENTS

| | | |
|---|---|---|
| 759,707 | 11/1933 | France. |

FRANK J. COHEN, *Primary Examiner.*

N. L. MINTZ, *Assistant Examiner.*